US006556165B2

(12) United States Patent
Fukushima et al.

(10) Patent No.: US 6,556,165 B2
(45) Date of Patent: Apr. 29, 2003

(54) ANTENNA APPARATUS AND WAVEGUIDE ROTARY COUPLER

(75) Inventors: Tomoaki Fukushima, Tokyo (JP); Ichiro Shirokawa, Tokyo (JP); Hidetaka Yamauchi, Tokyo (JP); Yoshihiko Konishi, Tokyo (JP); Akio Iida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,489

(22) Filed: Nov. 5, 2001

(65) Prior Publication Data

US 2002/0130808 A1 Sep. 19, 2002

(30) Foreign Application Priority Data

Mar. 16, 2001 (JP) ...................................... 2001-076062

(51) Int. Cl.[7] ............................ G01S 7/00; G01S 13/00

(52) U.S. Cl. ........................... 342/75; 342/74; 342/175; 343/757; 343/762; 343/763; 343/766

(58) Field of Search ............................ 342/73–81, 175; 343/720, 757, 758–766, 850–865; 336/83, 117, 119, 120; 310/40 R, 66, 90, 90.5; 318/480 V

(56) References Cited

U.S. PATENT DOCUMENTS 2,432,982 A * 12/1947 Braddon et al. .............. 336/83
3,040,310 A * 6/1962 Hausz ......................... 342/80
3,316,548 A * 4/1967 D'Amico ..................... 342/75
3,406,393 A * 10/1968 Kulik .......................... 342/75
3,519,969 A * 7/1970 Hoffman ..................... 336/120
3,772,695 A * 11/1973 Hoffman ...................... 342/77
3,793,634 A * 2/1974 Heller et al. .................. 342/80
3,821,738 A * 6/1974 Quesinberry et al. ......... 342/77
3,842,420 A * 10/1974 Rabow ........................ 342/75
3,971,019 A * 7/1976 Rymes ........................ 342/75
4,010,467 A * 3/1977 Slivka ......................... 342/77
4,030,099 A * 6/1977 Valenti et al. ................ 342/75
4,090,201 A * 5/1978 Whitman, Jr. ............... 342/75
4,148,026 A * 4/1979 Gendreu ...................... 342/80
4,148,029 A * 4/1979 Quesinberry ................. 342/77
4,151,527 A * 4/1979 Masliah et al. ............... 342/75
4,194,204 A * 3/1980 Alpers ......................... 342/80
4,321,572 A * 3/1982 Studer et al. ................. 336/83
4,754,180 A * 6/1988 Kiedrowski ................ 310/90.5
4,806,934 A * 2/1989 Magoon ...................... 342/77
4,837,576 A * 6/1989 Schwarz ...................... 342/77
4,908,630 A * 3/1990 Clerc ......................... 343/763
5,214,364 A 5/1993 Perdue et al.
5,592,176 A * 1/1997 Vickers et al. ................ 342/75
5,818,188 A * 10/1998 Hirai et al. ................. 318/480
6,087,985 A * 7/2000 Rummeli et al. ............. 342/78
6,107,958 A * 8/2000 Kelkar et al. ................. 342/73

FOREIGN PATENT DOCUMENTS

EP 0 926 690 6/1999
FR 0305286 A1 * 3/1989 ............. H01P/1/06
GB 2 257 301 1/1993

OTHER PUBLICATIONS

English Abstract of Japanese Patent Publication JP10270272; Oct. 19, 1998.
English Abstract of Japanese Patent Publication JP57025704; Feb. 10, 1982.
English Abstract of Japanese Patent Publication JP2000151252; May 30, 2000.

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

An AC power source applies power to a primary coil that is provided in a fixed part. An AC current flowing through the primary coil induces electromotive force in a secondary coil that is provided in a movable part. The AC electromotive force induced in the secondary coil is converted by an AC/DC converter into DC power, which is input to a drive control section.

14 Claims, 10 Drawing Sheets

ANTENNA APPARATUS AND WAVEGUIDE ROTARY COUPLER

BACKGROUND OF THE INVENTION

1. Field of the Invention

The present invention relates to an antenna apparatus that is mounted on a moving body such as an airplane for microwave communication with a communication satellite or the like, as well as to a waveguide rotary coupler used in such an antenna apparatus.

2. Description of the Related Art

FIG. 10 is a block diagram showing the configuration of a conventional antenna apparatus. In FIG. 10, reference numeral 1 denotes a movable part and reference numeral 2 denotes a fixed part that supports the movable part 1 in a moving body such as an airplane or a vehicle that is mounted with an antenna. The movable part 1 is provided with an antenna 3 for microwave communication with a communication satellite, a ground base station, or the like, an EL motor 4 for rotating the antenna 3 about the EL (elevation) axis, and an AZ motor 5 for rotating the antenna 3 about the AZ (azimuth) axis. The movable part 1 is also provided with an EL angle detector 6 for detecting the EL angle of the antenna 3, an AZ angle detector 7 for detecting the AZ angle of the antenna 3, and an antenna control section 8 for controlling the EL motor 4, the AZ motor 5, the EL angle detector 6, and the AZ angle detector 7. The antenna control section 8 is provided with a drive control section 9 for driving the EL motor 4 and the AZ motor 5 and a position detecting section 10 for reading antenna angles detected by the EL angle detector 6 and the AZ angle detector 7 and for outputting the antenna angles thus read to the drive control section 9.

In the fixed part 2, reference numeral 11 denotes a transceiver for generating a radio signal to be output from the antenna 3 and for frequency-converting a reception signal that is supplied from the antenna 3 and performing signal processing on a resulting signal. Reference numeral 12 denotes an attitude information detecting section for detecting the attitude of the moving body such as an airplane or a vehicle that is mounted with the antenna 3. For example, the attitude detecting section 12 detects attitudes of the moving body about the roll axis, the yawing axis, and the pitch axis and a latitude and longitude. Reference numeral 13 denotes a drive instruction generating section for converting attitude information obtained by the attitude detecting section 12 into information suitable for a coordinate system that is employed in the antenna control section 8 and for generating a drive instruction for a motor drive control. Reference numeral 14 denotes an AC power source of the movable part 1 and the fixed part 2, and reference numeral 15 denotes an AC/DC converter for converting an AC output of the AC power source 14 into DC power.

Reference numeral 16 denotes a waveguide rotary coupler that is provided between the movable part 1 and the fixed part 2 to transmit a radio output signal from the transceiver 11 to the antenna 3 and to transmit a reception signal from the antenna 3 to the transceiver 11. Reference numeral 17 denotes a slip ring that is provided between the movable part 1 and the fixed part 2 to transmit a drive instruction signal from the drive instruction generating section 13 to the drive control section 9. Reference numeral 18 denotes a slip ring that is provided between the movable part 1 and the fixed part 2 to transmit DC power produced by the AC/DC converter 15 to the antenna control section 8.

The operation of the above conventional antenna apparatus will be described below. The directivity of an antenna that is mounted on a moving body varies depending on the attitude of the moving body. The conventional antenna apparatus of FIG. 10 has the EL motor 4 and the AZ motor 5 for driving the antenna 3 about the EL axis and the AZ axis, respectively. A result of driving of the antenna 3 by the motors 4 and 5 is detected as antenna angles by the EL angle detector 6 and the AZ angle detector 7, read by the position detector 10, and then input to the drive control section 9. On the other hand, latitude/longitude information and attitude information of the moving body are obtained by the attitude detecting section 12. In many cases, as in this antenna apparatus, the attitude information of a moving body is represented by a roll coordinate, a pitch coordinate, and a yawing coordinate. The attitude information of the moving body concerned is coordinate-converted by the drive instruction generating section 13 into information suitable for the EL/AZ coordinate system that is employed in the drive control section 9, and the converted information is output to the drive control section 9 as a drive instruction. The drive control section 9 calculates a direction to which the antenna 3 should be directed based on the latitude/longitude information of the moving body and position information of a counterpart station such as a communication satellite, and drives the EL motor 4 and the AZ motor 5 after compensating the calculated direction for the attitude information of the moving body, that is, angular variations of the antenna 3 that are caused by a variation in its attitude.

For exchange of signals between the movable part 1 and the fixed part 2, the conventional antenna apparatus uses transmission parts such as the waveguide rotary coupler 16 and the slip rings 17 and 18. It is necessary to transmit a radio signal from the transceiver 11 to the antenna 3 and to transmit a reception signal from the antenna 3 to the transceiver 11. For transmission of a radio signal, a waveguide, which is high in transmission efficiency, may be used depending on the frequency band. In this antenna apparatus, the waveguide rotary coupler 16 is used between the movable part 1 and the fixed part 2. The waveguide rotary coupler 16, which is a waveguide coupler capable of rotation about a single axis, is disposed on the AZ axis as usual. That is, the movable part 1 is supported by the fixed part 2 in such a manner as to be able to rotate about the AZ axis and the waveguide rotary coupler 16 is disposed on the AZ axis. The slip rings 17 and 18 for transmitting attitude information and power, respectively, is disposed between the movable part 1 and the fixed part 2 on the same axis (i.e., the AZ axis) as the waveguide rotary coupler 16 is. The waveguide rotary coupler 16 and the slip rings 17 and 18 can transmit a radio output signal, attitude information, and power, respectively.

Although in the configuration of FIG. 10 the AZ motor 5 and the AZ angle detector 7 are provided in the movable part 1, they may be provided in the fixed part 2. In the latter case, the AZ motor 5 that is provided in the fixed part 2 rotates the movable part 1 about the AZ axis. Also in this case, it is necessary to transmit a radio output signal, attitude information, and power from the fixed part 2 to the movable part 1 via the waveguide rotary coupler 16 and the slip rings 17 and 18, respectively, that are disposed on the AZ axis.

The conventional antenna apparatus is configured in such a manner as to use the slip rings 17 and 18 to transmit attitude information and power, respectively, from the fixed part 2 to the movable part 1. Each of the slip rings 17 and 18 has a structure that a brush that is provided on a rotary shaft of one of the fixed side and the movable side is in contact with a ring-like electrode that is provided on a rotary shaft of the other, and hence is an electric part in which abrasion occurs between the brush and the ring-like electrode. Whereas communication equipment to be used in airplanes, ships, etc. are in many cases required to be highly reliably, the conventional antenna apparatus has a problem that the slip rings 17 and 18 used therein lower the reliability. That is, the slip rings 17 and 18 are a factor of causing such a failure as impairs signal transmission, because abrasion or dew condensation may occur there. To remove such a failure-causing factor, it is necessary to increase the mechanical accuracy and the rigidity of mechanical parts that incorporate the brush and the ring-like electrode as well as to take proper measures relating to a heat-related environment. There is another problem that mechanical parts for transmitting a radio signal, power, and attitude information need to be provided on the AZ axis along which the movable part 1 and the fixed part 2 are coupled to each other and it is difficult to miniaturize those parts.

SUMMARY OF THE INVENTION

The present invention has been made solve the above problems in the art, and an object of the invention is therefore to provide an antenna apparatus and a waveguide rotary coupler that enable signal transmission between the movable part and the fixed part in a non-contact manner and that can miniaturize the structures on the AZ axis.

A first aspect of the invention provides an antenna apparatus which performs microwave communication in such a manner that a radio signal generated by a transceiver that is provided in a fixed part is supplied to an antenna that is provided in a movable part and the antenna is drive-controlled, comprising a drive control section provided in the movable part, for drive-controlling a motor for rotating the antenna; a waveguide rotary coupling device for transmitting a radio signal from the transceiver to the antenna; a primary coil provided in the fixed part; and a secondary coil provided provided in the movable part, for supplying the drive control section with electromotive force that is inducted in itself by a current flowing through the primary coil.

The antenna apparatus according to the first aspect of the invention may be such that the primary coil provided on a member, in the fixed part, of the waveguide rotary coupling device; and the secondary coil provided on a member, in the movable part, of the waveguide rotary coupling device.

The antenna apparatus according to the first aspect of the invention may be such that the primary coil provided on a member in the fixed part so as to be located outside a side surface of the waveguide rotary coupling device with a rotary axis of the waveguide rotary coupling device as a center; and the secondary coil provided on a member in the movable so as to be opposed to the primary coil outside a side surface of the waveguide rotary coupling device.

The antenna apparatus according to the first aspect of the invention may be such that the primary coil and the secondary coil respectively provided two sets of coil for power transmission system and signal transmission system.

The antenna apparatus according to the first aspect of the invention may be such that the drive control section drive-controls a motor for rotating the antenna about an elevation rotation axis, and wherein a motor for rotating the movable part about an azimuth rotation axis of the antenna is provided in the fixed part.

The antenna apparatus according to the first aspect of the invention may be such that a signal obtained by super imposing a drive instruction signal on an AC power-supply current is input from a power system in the fixed part to the primary coil, and in the movable part the AC power-supply current and the drive instruction signal are separated from electromotive force induced in the secondary coil.

The antenna apparatus according to the first aspect of the invention may be such that an infrared transmitting section provided in the fixed part, for sending a drive instruction signal in the form of infrared light; and an infrared receiving section provided in the movable part, for receiving the drive instruction signal sent from the infrared transmitting section and for outputting the received drive instruction signal to the drive control section.

The antenna apparatus according to the first aspect of the invention may be such that the infrared transmitting section sends the infrared light toward an inside surface of a radome that covers the antenna, and the infrared receiving section receives infrared light that is reflected by the inside surface of the radome.

A second aspect of the invention provides a waveguide rotary coupler comprising a first waveguide member having a first waveguide that is circular in cross-section; a second waveguide member having a second waveguide having approximately the same cross-section as the first waveguide, an end face of the second waveguide member being opposed to an end face of the first waveguide member; a rotary bearing that couples the first waveguide member and the second waveguide member in such a manner that they are rotatable about a central axis of the first and the second waveguides; a first coil holder that is provided on the first waveguide member in a ring-like manner with the central axis of the first and second waveguides as a center and that holds a first coil; and a second coil holder that is provided on the second waveguide member in a ring-like manner with the central axis of the first and second waveguides as a center, and that holds a second coil that is opposed to the first coil, wherein the first and second coil holders are so shaped as to surround the first and second coils in a cross-section that is obtained by cutting the first and second coil holders by a plane including the central axis of the first and second waveguides.

In the waveguide rotary coupler according to the second aspect of the invention, wherein the first and second coil holders are formed separately from the first and second wave guide members, respectively, and then connected to the first and second waveguide members, respectively, after the first and second waveguide members are coupled to each other by the rotary bearing.

In the waveguide rotary coupler according to the second aspect of the invention, wherein the second coil is located outside the first coil and coextend with the first coil around the central axis of the first and second waveguides.

The waveguide rotary coupler just described above may be such that the first coil holder holds two first coils and the second coil holder holds two second coils that are opposed to the respective first coils.

In the waveguide rotary coupler according to the second aspect of the invention, the first and second waveguide members may be made of a magnetic material.

In the waveguide rotary coupler according to the second aspect of the invention, the rotary bearing may be made of a ceramic material.

According to the invention, in the antenna apparatus, power and a drive instruction signal can be transmitted, in a non-contact manner, from the fixed part to the drive control section that is provided in the movable part. Therefore, the factors that may cause failures in the case of using slip rings can be eliminated and the mechanical structures provided on the AZ axis between the fixed part and the movable part can be reduced in size.

Further, according to the invention, since the waveguide rotary coupler is provided with a transformer having coils that are coupled to each other electromagnetically, not only a radio signal but also power and a drive instruction signal can be transmitted in a non-contact manner.

DESCRIPTION OF THE PREFERRED EMBODIMENTS

Embodiment 1

Figure 1:
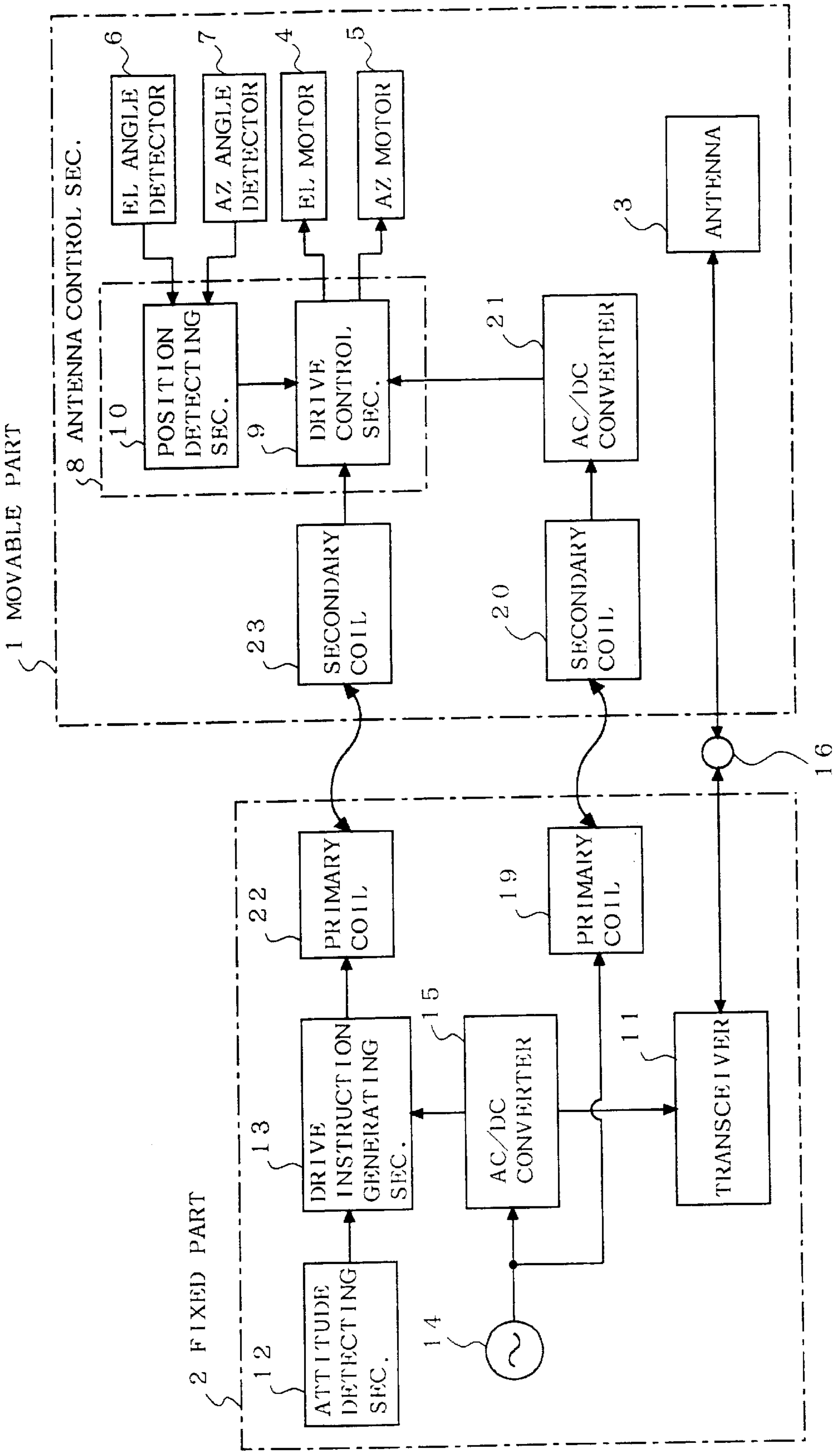
FIG. 1 is a block diagram showing the configuration of an antenna apparatus according to a first embodiment of the present invention.
Figure 2:
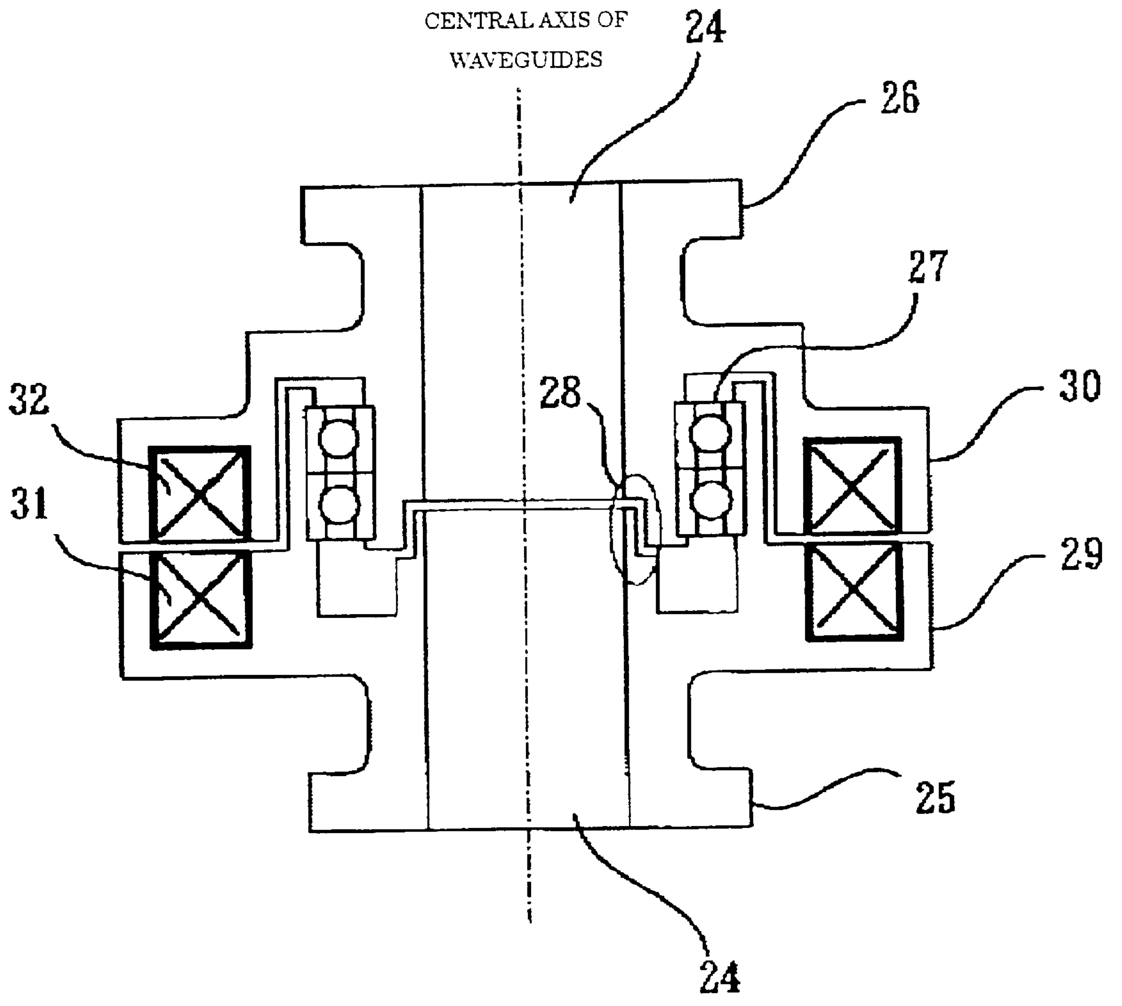
FIG. 2 is a sectional view of a waveguide rotary coupler that is used in the antenna apparatus of FIG. 1.
Figure 3:
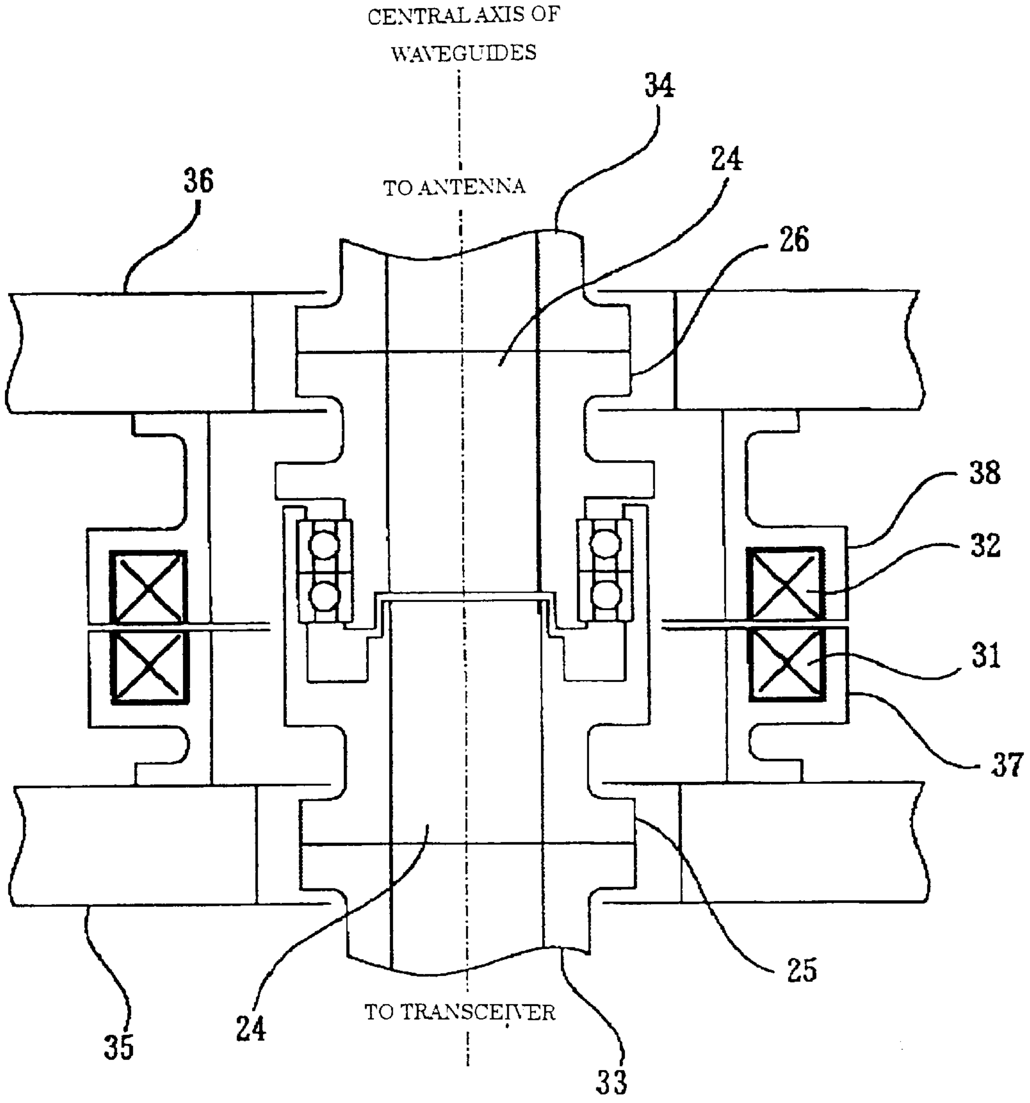
FIG. 3 is a sectional view of a waveguide rotary coupler, with another example of a coil portion, that is used in the antenna apparatus of FIG. 1.

An antenna apparatus according to a first embodiment of the present invention will be hereinafter described with reference to FIGS. 1–3. FIG. 1 is a block diagram showing the configuration of the antenna apparatus according to the first embodiment. FIG. 2 is a sectional view of a waveguide rotary coupler that is used in the antenna apparatus according to the first embodiment. FIG. 3 shows another example of a coil portion of the antenna apparatus according to the first embodiment.

Figure 10:
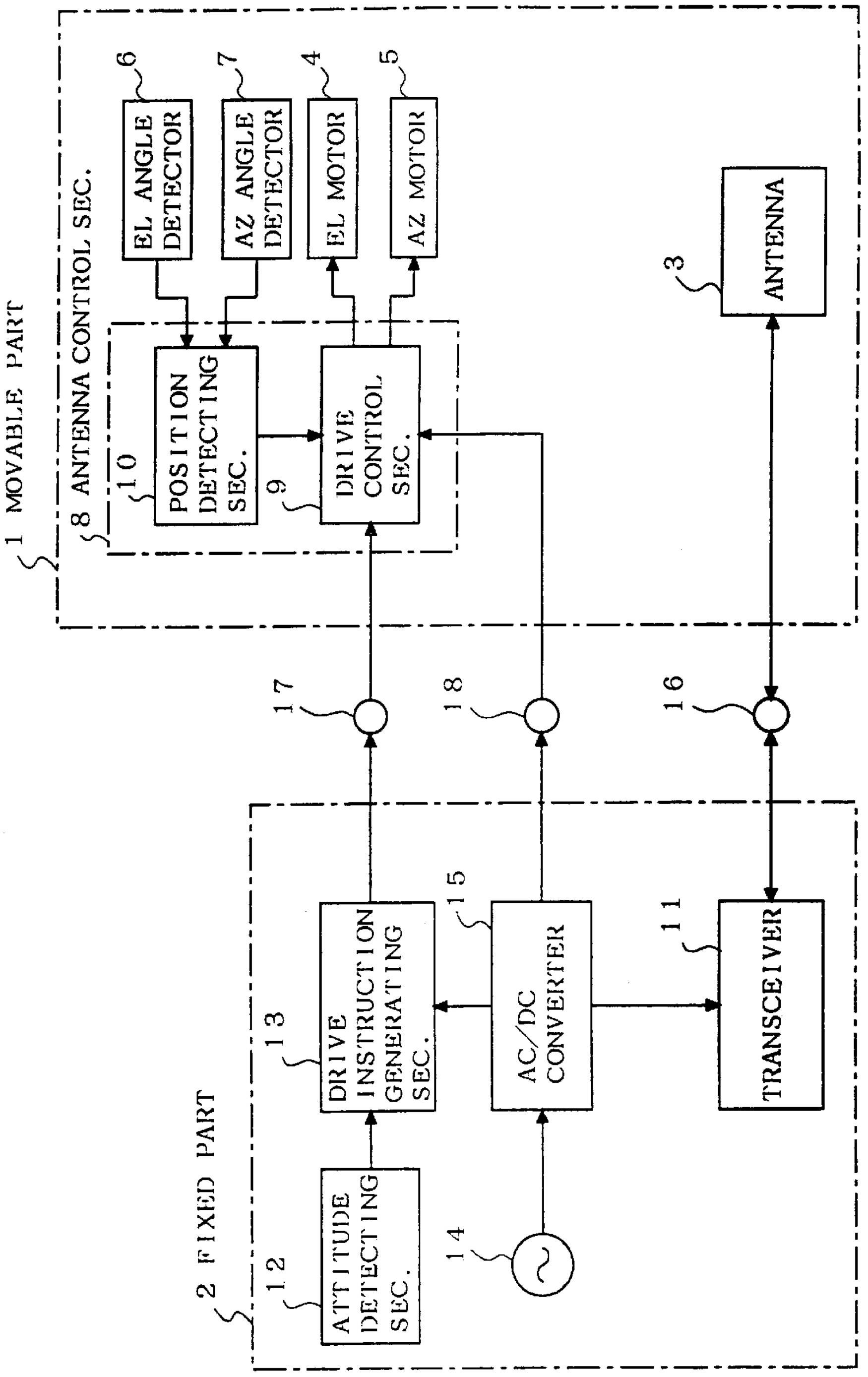
Fig. 10 PRIOR ART
FIG. 10 is a block diagram showing the configuration of a conventional antenna apparatus.

In FIG. 1, reference numeral 19 denotes a primary coil that is connected to an AC power source 14 that is provided in the fixed part 2 and reference numeral 20 denotes a secondary coil that is provided in the movable part 1, is electromagnetically coupled to the primary coil 19, and supplies the drive control section 9 with electromotive force induced by a current flowing through the primary coil 19. Reference numeral 21 denotes an AC/DC converter for converting AC induced electromotive force occurring in the secondary coil 20 into DC power and supplying it to the drive control section 9. Reference numeral 22 denotes a primary coil that is provided in the fixed section 1 and connected to the drive instruction generating section 13. Reference numeral 23 denotes a secondary coil that is provided in the movable part 1, is electromagnetically coupled to the primary coil 22, and supplies the drive control section 9 with electromotive force induced by a drive instruction signal flowing through the primary coil 22. The circuits in FIG. 1 having the same or corresponding circuits in FIG. 10 are given the same reference numerals as the latter.

The operation of the antenna apparatus according to the first embodiment will be described below. The directivity of an antenna that is mounted on a moving body varies depending on the attitude of the moving body. The antenna apparatus of FIG. 1 has the EL motor 4 and the AZ motor 5 for driving the antenna 3 about the EL axis and the AZ axis, respectively. A result of driving of the antenna 3 by the motors 4 and 5 is detected as antenna angles by the EL angle detector 6 and the AZ angle detector 7, read by the position detector 10, and then input to the drive control section 9. On the other hand, latitude/longitude information and attitude information of the moving body are obtained by the attitude detecting section 12. In many cases, as in this antenna apparatus, the attitude information of a moving body is represented by a roll coordinate, a pitch coordinate, and a yawing coordinate. The attitude information of the moving body concerned is coordinate-converted by the drive instruction generating section 13 into a drive instruction signal that is suitable for the EL/AX coordinate system employed in the drive control section 9, and the generated drive instruction signal is transmitted to the drive control section 9. Latitude/longitude information may be calculated by receiving signals from GPS satellites.

Roughly four kinds of drive instructions are conceivable: (1) attitude information and latitude/longitude information of the moving body; (2) antenna coordinates with respect to the earth; (3) antenna coordinates with respect to the moving body; and (4) driving directions and driving speeds of the EL motor 4 and the AZ motor 5. In general, in airplanes, the environment in which the movable part is installed is severer than the environment in which the fixed part is installed and the maintenance of the movable part is poorer than that of the fixed part. Therefore, to increase the reliability of the entire antenna apparatus, it is better to concentrate more electronic parts in the fixed part as possible. There liability is increased by using only logic circuits in the movable part without using a microprocessor. Since the amount of calculation that is necessary for generation of a drive instruction increases in order of items (1), (2), (3), and (4), the electronic circuit scale of the drive control section 9 decreases and there liability of the movable part 1 increases in order of items (1), (2), (3), and(4). The rate of communication between the drive instruction generating section 13 and the drive control section 9 should be increased in order of items (1), (2), (3), and (4). Selection may be made from items (1)–(4) in consideration of tradeoffs among the above factors.

The antenna apparatus of FIG. 1 has the waveguide rotary coupler 16 for signal exchange between the movable part 1 and the fixed part 2. It is necessary to transmit a radio signal from the transceiver 11 to the antenna 3 and to transmit a reception signal from the antenna 3 to the transceiver 11. For transmission of a radio signal, a waveguide, which is high in transmission efficiency, may be used depending on the frequency band. In this antenna apparatus, the waveguide rotary coupler 16 is used between the movable part 1 and the fixed part 2. If a radio transmitting section were provided in the movable part 1, the movable part 1 would become voluminous because a high-power amplifier in the radio transmitting section and a stabilized power source etc. around the high-power amplifier are large and heavy. This would necessitate size increase of the motors and the drive control section 9 for rotationally driving the voluminous movable part 1. For example, where the antenna apparatus is mounted on an airplane and used for communication with a communication satellite or a ground base station, in many cases the movable part 1 including the antenna 3 is installed in a radome or a pod that projects from the fuselage of the airplane. The increase in the size of the movable part 1 is a factor of increasing the air resistance of the airplane. Also where the antenna apparatus is used being mounted on the roof of a vehicle, the movable part 1 is required to be compact mainly from the viewpoints of appearance and structure. For those reasons, to make the movable part 1 compact, the transceiver 11 including a transmitting section that has a high-power amplifier is provided in the fixed part 2.

Next, a description will be made of transmission of power and a signal from the fixed part 2 to the movable part 1 in the antenna apparatus according to the first embodiment. First, as for the power system, power of the AC power source 14 is applied to the primary coil 19 that is provided in the fixed part 2. Electromotive force is induced in the secondary coil 20 that is provided in the movable part 1 by the alternating current flowing through the primary coil 19. The AC electromotive force induced in the secondary coil 20 is converted by the AC/DC converter 21 into DC power, which is input to the drive control section 9. The signal system is similar in configuration and operation to the power system. A drive instruction signal that is output from the drive instruction generating section 13 is applied to the primary coil 22 that is provided in the fixed part 2. Since the secondary coil 23 is electromagnetically coupled to the primary coil 22, electromotive force is induced in the secondary coil 23 by the drive instruction signal flowing through the primary coil 22 and is supplied to the drive control section 9.

Next, the waveguide rotary coupler 16 that is used in the antenna apparatus according to the first embodiment will be described with reference to FIG. 2. FIG. 2 is a sectional view of the waveguide rotary coupler 16. Reference numeral 24 denotes waveguides each having a circular cross-section and reference numerals 25 and 26 denote waveguide members having the respective waveguides 24. Reference numeral 27 denotes a bearing. The waveguide members 25 and 26 are coupled to each other via the bearing 27, whereby the waveguide members 25 and 26 are supported so as to be rotatable with respect to each other about the central axis of the waveguides 24. The rotation axis of the waveguide rotary coupling device approximately coincides with the central axis of the waveguides 24. Reference numeral 28 denotes a microwave choking portion provided in a joint between the waveguide members 25 and 26. Reference numerals 29 and 30 denote ring-shaped coil holders provided in the respective waveguide members 25 and 26 circularly with the central axis of the waveguides 24 as a center. Reference numerals 31 and 32 denote ring-shaped coils that are attached to the coil holders 29 and 30, respectively, and extend circularly with the central axis of the waveguides 24 as a center. The above coils and coil holders may assume shapes other than the ring shape such as a square. However, the ring shape is preferable to secure high signal transmission efficiency. The wires of the coils 31 and 32 should be wound circularly about the central axis of the waveguides 24. This manner of winding of the coils also applies to second to seventh embodiment described later.

The waveguide rotary coupler 16 is configured as shown in FIG. 2 and the central axis of the waveguides 24 is aligned with the AZ axis. The coil 31, for example, is used as a primary coil. When AC power is applied from the AC power source 14 to the coil 31, electromotive force is induced in the coil 32 by electromagnetic induction. In this manner, AC power can be transmitted form the coil 31 to the coil 32. The coils 31 and 32 operate in a similar manner also when the coil 32 is used as a primary coil or a drive instruction signal is applied to the coil 31. Since higher transmission efficiency is obtained when the coils 31 and 32 are closer to each other, a proper gap is formed between the coils 31 and 32. FIG. 2 shows a single transformer having the coils 31 and 32. For transmission of both of power and a signal from the fixed part 2 to the movable part 1, another set of coils may be provided in the waveguide members 25 and 26. Covering the coils 31 and 32 with the respective coil holders 29 and 30 provides an advantage of increasing the magnetic flux density around the coil holders 29 and 30 and hence increasing the power transmission efficiency.

FIG. 3 shows the structures of another example of the coil portion in a case where the main body of the waveguide rotary coupler 16 is not provided with coils. In FIG. 3, reference numeral 33 denotes a waveguide that is attached to the waveguide member 25. The other end of the waveguide 33 is connected to the transceiver 11. Reference numeral 34 denotes a waveguide that is attached to the waveguide member 26. The other end of the waveguide 34 is connected to the antenna 3. Reference numerals 35 and 36 denote flange members of the fixed part 2 and the movable part 1, respectively. The devices of the movable part 1 such as the antenna 3 and the drive control section 9 are provided on the flange member 36. Reference numeral 37 denotes a ring-shaped coil holder that is provided on the flange member 35 of the fixed part 2 circularly with the central axis of the waveguides 24 (e.g., AZ axis) as a center. Reference numeral 38 denotes a ring-shaped coil holder that is provided on the flange member 36 of the movable part 1 circularly with the central axis of the waveguides 24 (e.g., AZ axis) as a center. The parts in FIG. 3 having the same or corresponding parts in FIG. 2 are given the same reference numerals as the latter.

As in the case of FIG. 2, the coils 31 and 32 are provided in the respective coil holders 37 and 38 and AC power from the AC power source 14 or a drive instruction signal from the drive instruction generating section 13 is transmitted by electromagnetic induction between the coils 31 and 32.

Although in FIG. 1 the AZ motor 5 and the AZ angle detector 7 are provided in the movable part 1, they may be provided in the fixed part 2. In the latter case, the movable part 1 is rotated by the AZ motor 5 that is provided in the fixed part 2. Even in this case, a radio output signal, power, and a drive instruction signal are transmitted from the fixed part 2 to the movable part 1 via the waveguide rotary coupler 16, the primary coil 19/secondary coil 20, and the primary coil 22/secondary coil 23. The part of the drive control section 9 which corresponds to the AZ motor 5 and the part of the position detecting section 10 which reads an angle detected by the AZ angle detector 7 are provided in the fixed part 2.

Embodiment 2

Figure 4:
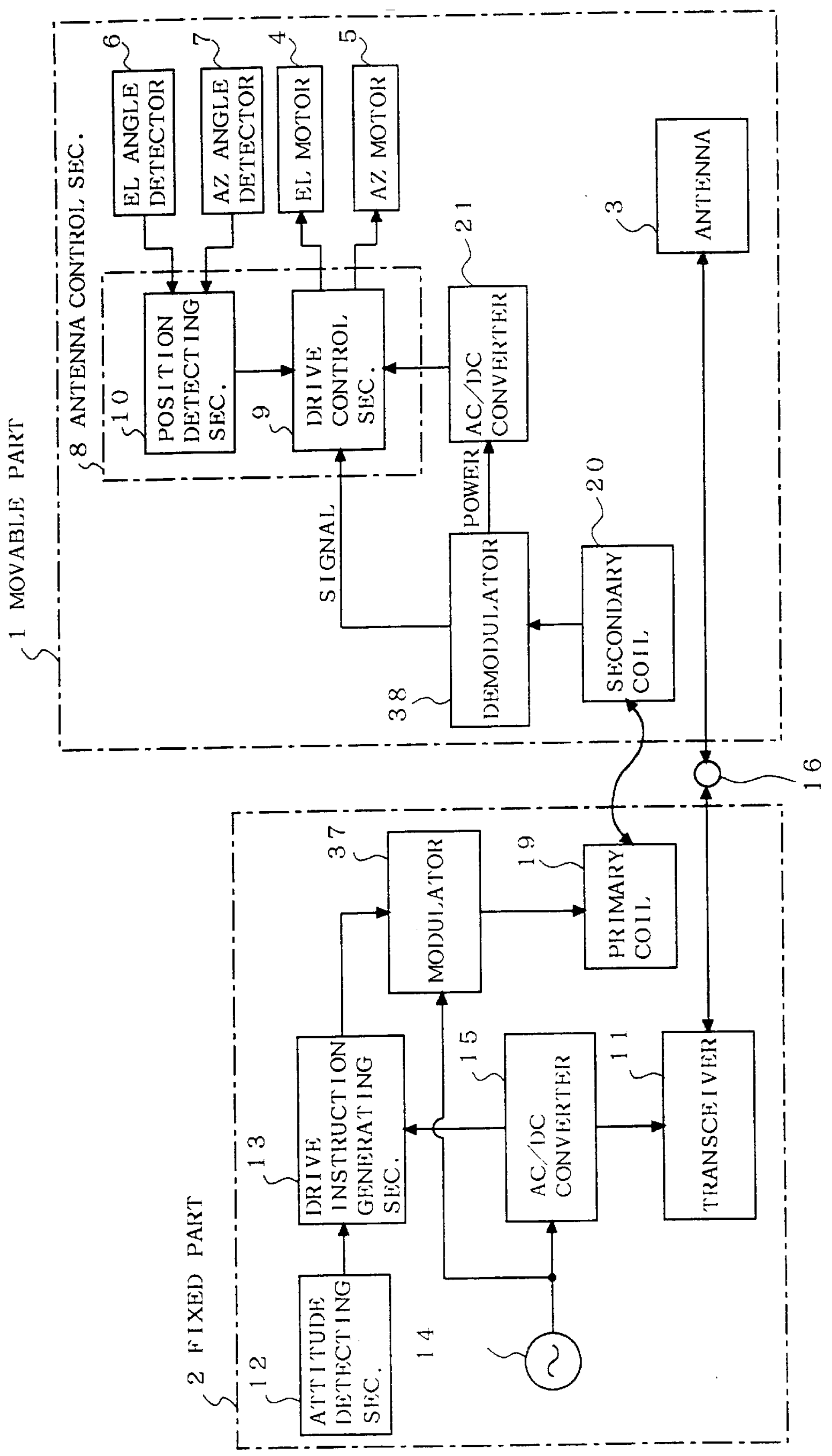
FIG. 4 is a block diagram showing the configuration of an antenna apparatus according to a second embodiment of the invention.

FIG. 4 is a block diagram showing the configuration of an antenna apparatus according to a second embodiment of the invention. In FIG. 4, reference numeral 37 denotes a modulator for superimposing a drive instruction signal that is output from the drive instruction generating section 13 on an AC power-supply current that is output from the AC power source 14. Reference numeral 38 denotes a demodulator for demodulating a signal that is transmitted to the secondary coil 20 into an AC power-supply current and a drive instruction signal. The circuits in FIG. 4 having the same or corresponding circuits in FIG. 1 are given the same reference numerals as the latter.

In the antenna apparatus according to the second embodiment, power and a drive instruction signal to be transmitted from the fixed part 2 to the movable part 1 are superimposed one on another and thereby combined into a single signal. This makes it sufficient to provide only a single transformer having a primary coil and a secondary coil. That is, the modulator 37 superimposes a drive instruction signal that is output from the drive instruction generating section 13 on an AC power-supply current that is output from the AC power source 14. The modulation method of the modulator 37 may be a method in which a drive instruction signal is superimposed on a power-supply current, a method in which a drive instruction signal is digitized and then phase-modulated or amplitude-modulated, a frequency-modulation method, or the like. After a drive instruction signal is superimposed on an AC power-supply current, a resulting signal is transmitted from the primary coil 19 to the secondary coil 20 by electromagnetic induction. The demodulator 38 demodulates the transmitted signal into the power-supply current and the drive instruction signal, which are input to the AC/DC converter 21 and the drive control section 9, respectively.

The above configuration and operation allow the single transformer having the primary coil 19 and the secondary coil 20 to transmit power and a drive instruction signal from the fixed part 2 to the movable part 1. Not only the structures of the waveguide rotary coupler 16 and coil portion according to the first embodiment that were described above with reference to FIGS. 2 and 3 but also the modifications such as the AZ motor 5 and the AZ angle detector 7 being provided in the fixed part 2 can also be applied to the second embodiment.

Embodiment 3

Figure 5:
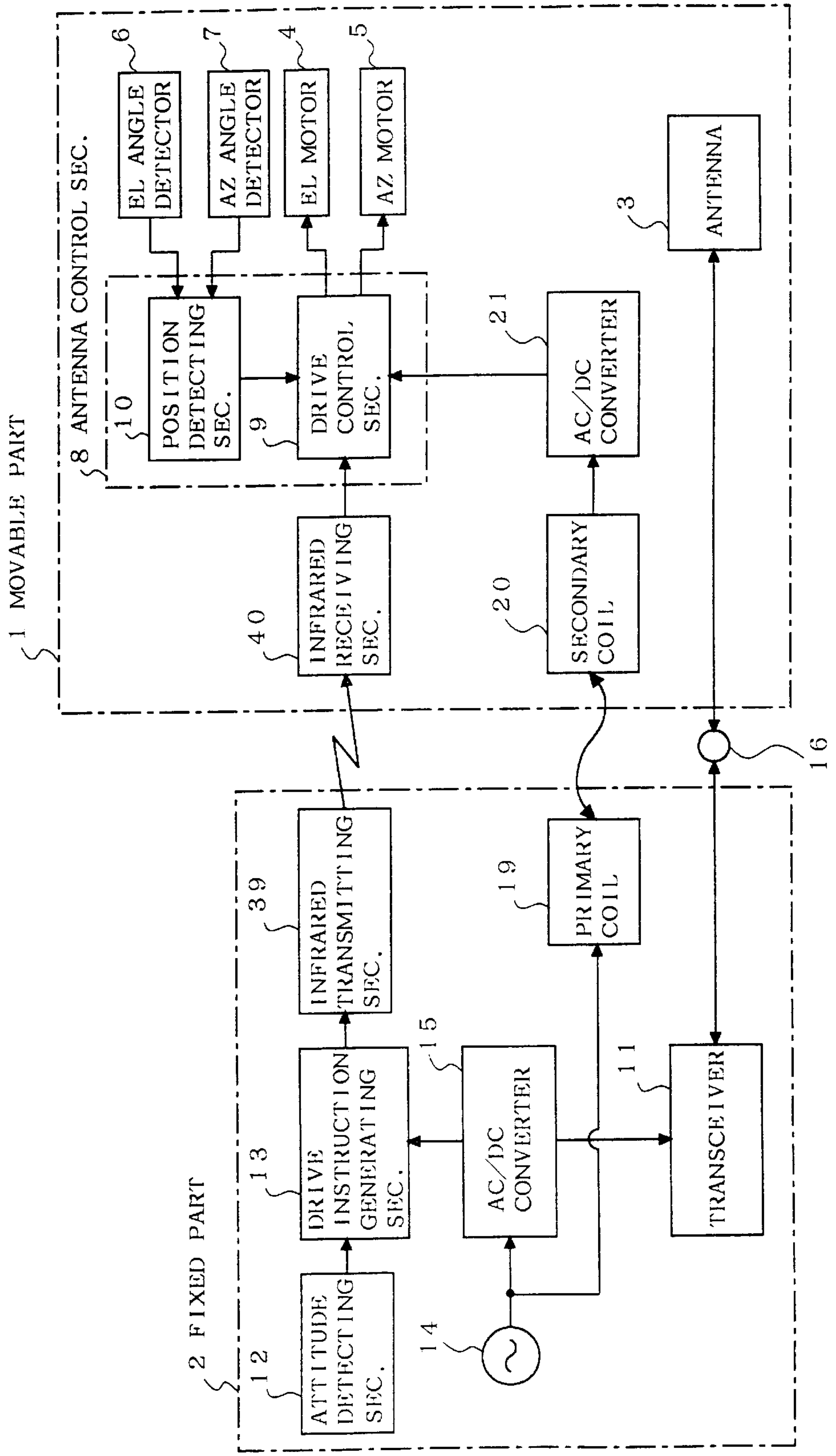
FIG. 5 is a block diagram showing the configuration of an antenna apparatus according to a third embodiment of the invention.
Figure 6:
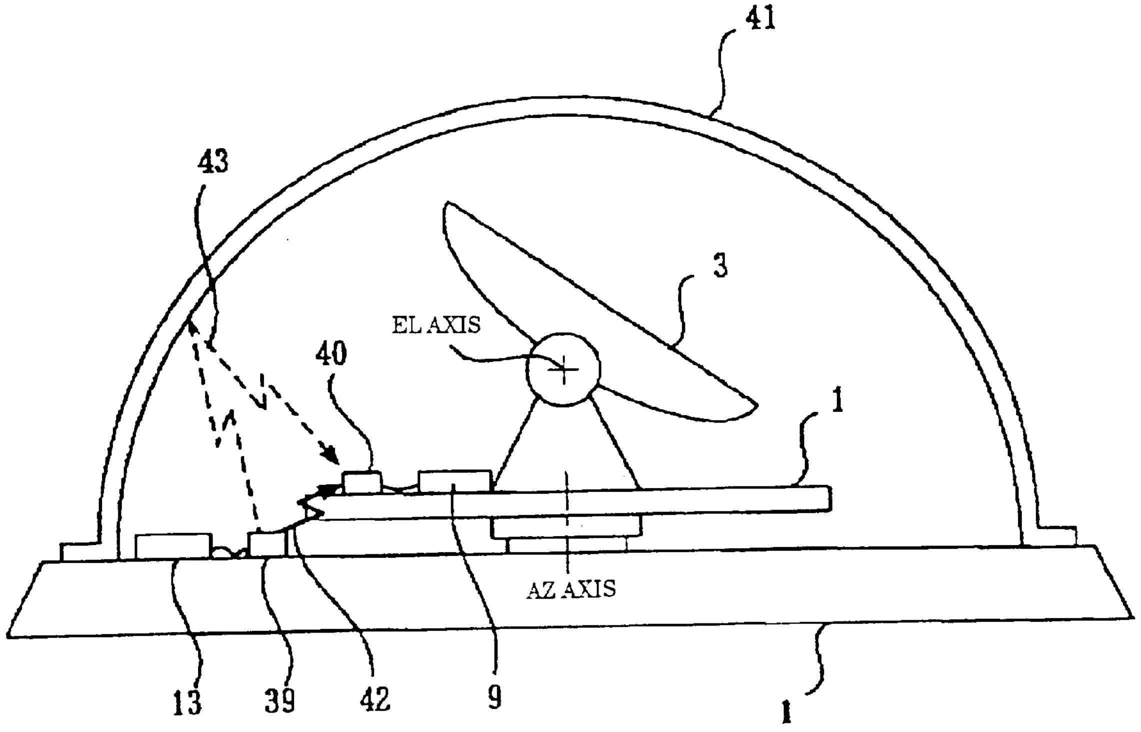
FIG. 6 shows an appearance of the antenna apparatus of FIG. 5.

An antenna apparatus according to a third embodiment of the invention will be described below with reference to FIGS. 5 and 6. FIG. 5 is a block diagram showing the configuration of an antenna apparatus according to a third embodiment of the invention. FIG. 6 shows an appearance of the antenna apparatus of FIG. 5. In FIG. 5, reference numeral 39 denotes an infrared transmitting section for transmitting, as an infrared signal, a drive instruction signal that is output from the drive instruction generating section 13. Reference numeral 40 denotes an infrared receiving section for receiving an infrared signal that is sent from the infrared transmitting section 39, demodulating it into a drive instruction signal, and outputting the latter to the drive control section 9. The circuits in FIG. 5 having the same or corresponding circuits in FIG. 1 are given the same reference numerals as the latter.

In the antenna apparatus according to the third embodiment, a drive instruction signal that is output from the drive instruction generating section 13 is transmitted from the fixed part 2 to the movable part 1 in such a manner as to be sent and received in the form of an infrared signal. Referring to FIG. 6, as for the infrared communication of a drive instruction signal from the infrared transmitting section 39 to the infrared receiving section 40, direct transmission can be performed along a direct path 42 at a rotary position about the AZ axis where there is no obstruction between the infrared transmitting section 39 and the infrared receiving section 40. Since the antenna 3 is covered with a radome 41, when there is an obstruction between the infrared transmitting section 39 and the infrared receiving section 40, an indirect path 43 can be used in such a manner that infrared light is sent toward the inside surface of the radome 41, is reflected thereby, and then reaches the infrared receiving section 40. The positional relationship between the infrared transmitting section 39 and the infrared receiving section 40 is uniquely determined by the driving of the antenna 3 about the AZ axis. Therefore, for example, a method may be employed in which an AZ angle range (the AZ angle can be detected by the AZ angle detector 7) where there is an obstruction (i.e., the antenna 3) between the infrared transmitting section 39 and the infrared receiving section 40 is stored and infrared light is sent toward the inside surface of the radome 41 in such an AZ angle range.

For example, infrared light is sent and received in the following manner. A digital signal to be transmitted is modulated at 37.9 kHz in the same manner as is done in an infrared remote controller of a consumer electric product or the like. Sending and receiving are discriminated from each other by setting different codes for those at the head of data to be sent. Alternatively, data may be modulated at different frequencies in sending and receiving. Since the ambient light quantity of the infrared transmitting section 39 and the infrared receiving section 40 varies depending on the quantity of light coming through the radome 41, it is necessary to cause a sufficient amount of current to flow through a infrared light emitting diode. Alternatively, a method may be employed in which a sensor for detecting a light quantity is added and the quantity of light emitted from the infrared light emitting diode or the sensitivity of a reception-side phototransistor is varied in accordance with the output of the sensor.

Embodiment 4

Figure 7:
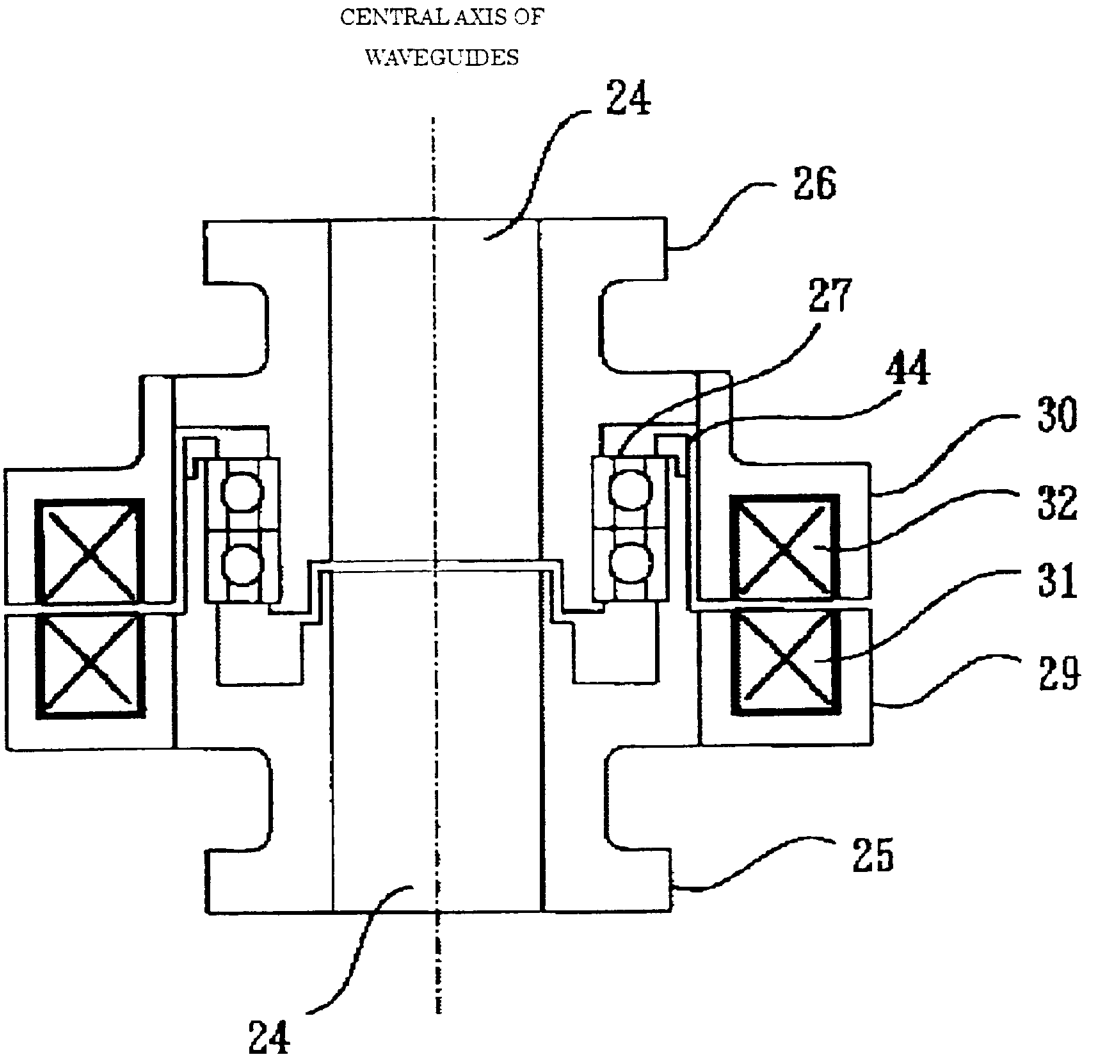
FIG. 7 is a sectional view of a waveguide rotary coupler according to a fourth embodiment of the invention.

The basic configuration of the-waveguide rotary coupler 16 having the coil portion was described in the first embodiment with reference to FIG. 2. A fourth embodiment of the invention is directed to another example of the waveguide rotary coupler 16. FIG. 7 is a sectional view of a waveguide rotary coupler according to the fourth embodiment. In the fourth embodiment, the coil holder 29 is separated from the waveguide member 25 and the coil holder 30 is separated from the waveguide member 26. The other parts in FIG. 7 have the same structures as the corresponding parts in FIG. 2.

Where as the configuration of FIG. 2 in which the coil holder 29 is integral with the waveguide member 25 and the coil holder 30 is also integral with the waveguide member 26 is advantageous in that the number of parts is small, it is disadvantageous in that the waveguide member 25 and the waveguide member 26 have complex shapes to accommodate the bearing 27 and the coils 29 and 30 and the incorporation of the bearing 27 is particularly difficult. To solve this problem, in the fourth embodiment, the coil holder 29 is separated from the waveguide member 25 and the coil holder 30 is separated from the waveguide member 26.

An assembling procedure of the waveguide rotary coupler of FIG. 7 will be described below. First, the bearing 27 is incorporated in the waveguide member 26. A tip portion 44 of the waveguide member 25 has been inserted in the waveguide member 26 before the bearing 27 is incorporated in the waveguide member 26. Then, the waveguide member 25 is inserted in such a manner that the surface of the waveguide member 25 to contact the outside circumferential surface of the bearing 27 goes along the outside circumferential surface of the bearing 27, and the waveguide member 25 is connected to the tip portion 44 that was inserted in advance. To fasten the bearing 27, it is preferable that the waveguide member 25 is connected to the tip portion 44 by screwing. However, other various connecting methods that are used commonly in mechanical assembling may also be used. In this state, the coil holder 30 has not been attached to the waveguide member 26, the work of connecting the waveguide member 25 to the tip portion 44 can be performed from the side of the waveguide rotary coupler, which means increased ease of assembling. Then, the coil holders 29 and 30 are connected to the respective waveguide members 25 and 26. This may be done by either screwing or bonding.

Increased ease of assembling can similarly be attained by integrating the coil holder 29 with the waveguide member 25 while separating the coil holder 30 from the waveguide member 26. Naturally, the waveguide rotary coupler according to the fourth embodiment can be applied to the antenna apparatuses according to the first to third embodiments.

Embodiment 5

Figure 8:
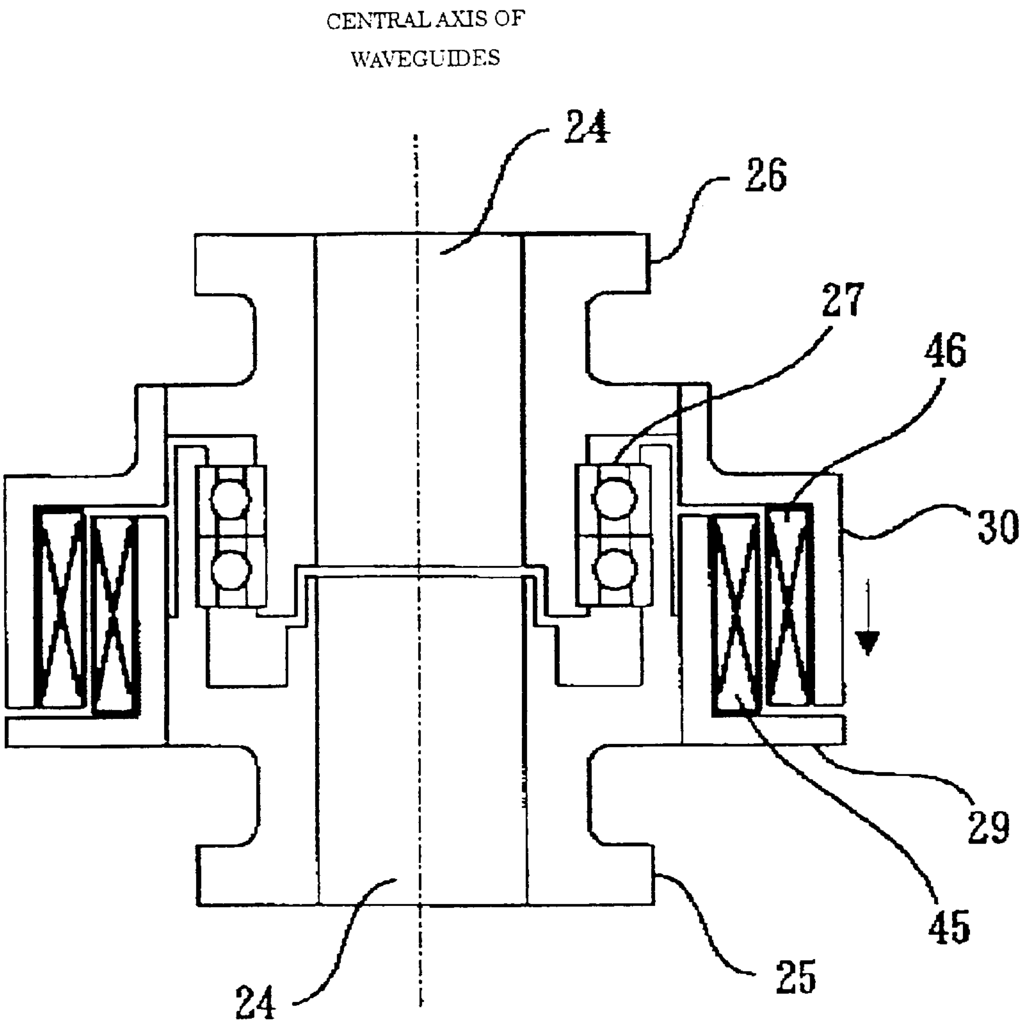
FIG. 8 is a sectional view of a waveguide rotary coupler according to a fifth embodiment of the invention.

FIG. 8 is a sectional view of a waveguide rotary coupler according to a fifth embodiment of the invention. In FIG. 8, reference numeral 45 denotes a ring-shaped coil that extends circularly with the central axis of the waveguides 24 as a center. The coil 45 is attached to a coil holder 29. Reference numeral 46 denotes a ring-shaped coil that extends circularly with the central axis of the waveguides 24 as a center. The coil 46 is attached to a coil holder 30 in such a manner as to be located outside and coextend with the coil 45. The parts in FIG. 8 having the same or corresponding parts in FIG. 7 are given the same reference numerals.

Disposing the coil 46 in such a manner that it is located outside and coextend with the coil 45 increases the efficiency of power transmission between the coils 45 and 46. The coils 45 and 46 are disposed in such a manner as to coextend with each other around the central axis of the waveguides 24 and not to be in contact with each other. As shown in FIG. 8, the coil holder 29 has an L-shaped cross-section when cut by a plane including the central axis (e.g., the cross-section of FIG. 8). This is to facilitate accommodation of the coil 45 in the coil holder 29 as well as its positioning. The outside circumferential surface of the coil holder 30 extends in the axial direction (indicated by an arrow in FIG. 8) to such an extent as to cover the coil 46 in the axial direction. This similarly facilitates accommodation of the coil 46 in the coil holder 30 as well as its positioning. The above structures facilitate adjustment of the gap between the coils 45 and 46.

As shown in FIGS. 7 and 8, those portions of the coil holders 29 and 30 which cover the coils 45 and 46 (FIG. 8) or 31 and 32 (FIG. 7) have rectangular frame shapes that are approximately equal in area, based on which it is concluded that the magnetic resistance around each coil in FIG. 8 is approximately the same as that in FIG. 7.

The coil holder 29 is separated from the waveguide member 25 and the coil holder 30 is separated from the waveguide member 26, and the coil holders 29 and 30 are connected to the respective waveguide members 25 and 26 in assembling. This is the same as in the fourth embodiment. However, the coil holder 29 and/or the coil holder 30 may be integral with the waveguide member 25 and/or the waveguide member 26 as long as the waveguide rotary coupler can be assembled with a sufficient level of ease. The waveguide rotary coupler according to the fifth embodiment can be applied to the antenna apparatuses according to the first to third embodiments.

Embodiment 6

Figure 9:
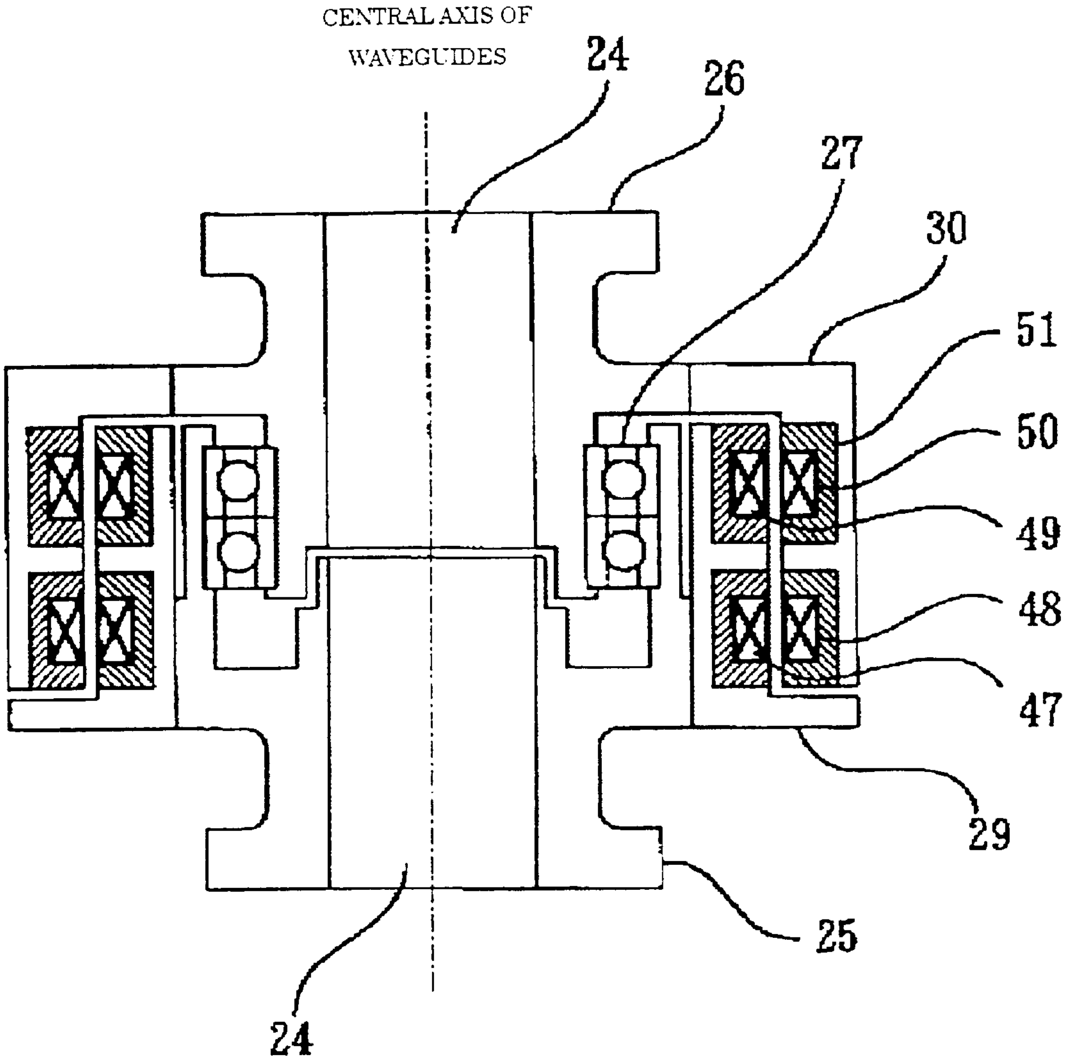
FIG. 9 is a sectional view of a waveguide rotary coupler according to a sixth embodiment of the invention.

FIG. 9 is a sectional view of a waveguide rotary coupler according to a sixth embodiment of the invention. In FIG. 9, reference numeral 47 denotes a ring-shaped coil that extends circularly with the central axis of the waveguides 24 as a center. The coil 47 is attached to a coil holder 29. Reference numeral 48 denotes a ring-shaped coil that extends circularly with the central axis of the waveguides 24 as a center. The coil 48 is attached to a coil holder 30 in such a manner as to be located outside and coextend with the coil 47. Reference numeral 49 denotes a ring-shaped coil that extends circularly with the central axis of the waveguides 24 as a center. The coil 49 is attached to the coil holder 29. Reference numeral 50 denotes a ring-shaped coil that extends circularly with the central axis of the waveguides 24 as a center. The coil 50 is attached to the coil holder 30 in such a manner as to be located outside and coextend with the coil. 49. The coils 47 and 49 are accommodated in the coil holder 29 side by side with an interval along the central axis of the waveguides 24. The coils 48 and 50, which correspond to the respective coils 47 and 49, are accommodated in the coil holder 30 side by side with an interval along the central axis of the waveguides 24. Reference numeral 51 denotes core members that cover the respective coils 47–50. The parts in FIG. 8 having the same or corresponding parts in FIG. 7 are given the same reference numerals as the latter.

In the sixth embodiment, since the waveguide rotary coupler is provided with the two transformers each having the two coils that are coupled to each other electromagnetically, one transformer can be used for transmission of power and the other for transmission for a drive instruction signal. The relationship between the coils 47 and 48 shown in FIG. 9 is the same as that between the coils 45 and 46 shown in FIG. 8. Disposing the coil 48 outside the coil 47 in such a manner that they coextend with each other can increase the efficiency of power transmission between the coils 47 and 48. The same is true of the coils 49 and 50.

The reason why the core members 51 are provided in the coil holders 29 and 30 so as to surround the coils 49 and 50 as shown in FIG. 9 is to form magnetic circuits around the coils 49 and 50 and thereby strengthen the magnetic coupling. For the same reason, the core members 51 are provided for the coils 47 and 48.

The coil holder 29 is separated from the waveguide member 25 and the coil holder 30 is separated from the waveguide member 26, and the coil holders 29 and 30 are connected to the respective waveguide members 25 and 26 in assembling. This is the same as in the fourth embodiment. However, the coil holder 29 and/or the coil holder 30 may be integral with the waveguide member 25 and/or the waveguide member 26 as long as the waveguide rotary coupler can be assembled with a sufficient level of ease. The waveguide rotary coupler according to the sixth embodiment can be applied to the antenna apparatuses according to the first to third embodiments.

Embodiment 7

The first to sixth embodiments are mainly directed to the arrangement, the shapes, etc. of the parts of the waveguide rotary couplers. In contrast, a seventh embodiment of the invention is directed to how to select materials of the constituent parts of those waveguide rotary couplers.

In the waveguide rotary coupler of FIG. 2 according to the first embodiment, by forming the coil holders 29 and 30

(core members) with a magnetic material (e.g., ferrite or pressed powder iron; this also applies below), magnetic circuits are formed around the coils 31 and 32 and the power transmission efficiency can thereby be increased. To decrease the size of the coil holders, a material capable of increasing the magnetic flux density should be selected. However, energy loss due to eddy current may occur in magnetic materials having high conductivity (e.g., Fe-Ni alloys and silicon steels). Therefore, ferrite, pressed powder iron, etc. (mentioned above) are suitable core materials. However, in the case of airplanes, the power supply frequency may be as low as about 400 Hz, in which case eddy current is relatively small even if it occurs in a silicon steel. In this case, the size of the coil holders can be decreased by using a silicon steel capable of increasing the magnetic flux density. This is also true of the following descriptions relating to the core member.

Forming also the waveguide members 25 and 26 with a magnetic material increases the efficiency of power transmission between the coils 31 and 32, because the waveguide members 25 and 26 also exists in the spaces of the magnetic circuits. Usually, the bearing 27 is made of a conductive material such as stainless steel. If the density of magnetic field lines crossing the bearing 27 is high and heat is generated there due to eddy current, a non-metallic bearing such as a ceramic bearing may be used.

Also in the waveguide rotary coupler of FIG. 3, the coil holders 37 and 38 as the core members of the respective coils 31 and 32 are formed with a magnetic material.

Also in the waveguide rotary coupler of FIG. 7 according to the fourth embodiment and the waveguide rotary coupler of FIG. 8 according to the fifth embodiment, the materials of the constituent parts are selected in the same manner as in the above-described waveguide rotary coupler of FIG. 2. The coil holders 29 and 30 are formed with a magnetic material. The materials of the waveguide members 25 and 26 and the bearing 27 are selected in the same manner as in the above-described waveguide rotary coupler of FIG. 2.

In the waveguide rotary coupler of FIG. 9 according to the sixth embodiment, the material of the core members 51 that are provided around the coils 47–50 is selected according to the same criteria as used in selecting the material of the core members of the waveguide rotary coupler of FIG. 2. The materials of the waveguide members 25 and 26 and the bearing 27 are selected in the same manner as in the above-described waveguide rotary coupler of FIG. 2.

The above-described manners of selecting the materials of the waveguide rotary coupler in the seventh embodiment are also applied to the waveguide rotary couplers according to the first to sixth embodiments.

What is claimed is:

1. An antenna apparatus which performs microwave communication in such a manner that a radio signal generated by a transceiver that is provided in a fixed part is supplied to an antenna that is provided in a movable part and the antenna is drive-controlled, comprising:

a drive control section provided in the movable part, for drive-controlling a motor for rotating the antenna;

a wave guide rotary coupling device for transmitting a radio signal from the transceiver to the antenna;

a primary coil provided in the fixed part; and a secondary coil provided in the movable part, for supplying the drive control section with electromotive force that is inducted in itself by a current flowing through the primary coil.

2. The antenna apparatus according to claim 1, wherein the primary coil is provided on a member, in the fixed part, of the waveguide rotary coupling device; and the secondary coil is provided on a member, in the movable part, of the waveguide rotary coupling device.

3. The antenna apparatus according to claim 1, wherein the primary coil is provided on a member in the fixed part so as to be located outside a side surface of the waveguide rotary coupling device with a rotary axis of the waveguide rotary coupling device as a center; and the secondary coil is provided on a member in the movable part so as to be opposed to the primary coil outside a side surface of the waveguide rotary coupling device.

4. The antenna apparatus according to claim 1, wherein the primary coil and the secondary coil respectively provide two sets of coil for power transmission system and signal transmission system.

5. The antenna apparatus according to claim 1, wherein the drive control section drive-controls a motor for rotating the antenna about an elevation rotation axis, and wherein a motor for rotating the movable part about an azimuth rotation axis of the antenna is provided in the fixed part.

6. The antenna apparatus according to claim 1, wherein a signal obtained by superimposing a drive instruction signal on an AC power-supply current is input from a power system in the fixed part to the primary coil, and in the movable part the AC power-supply current and the drive instruction signal are separated from electromotive force induced in the secondary coil.

7. The antenna apparatus according to claim 1, wherein an infrared transmitting section is provided in the fixed part, for sending a drive instruction signal in the form of infrared light; and an infrared receiving section is provided in the movable part, for receiving the drive instruction signal sent from the infrared transmitting section and for outputting the received drive instruction signal to the drive control section.

8. The antenna apparatus according to claim 7, wherein the infrared transmitting section sends the infrared light toward an inside surface of a radome that covers the antenna, and the infrared receiving section receives infrared light that is reflected by the inside surface of the radome.

9. A waveguide rotary coupler comprising:

a first waveguide member having a first waveguide that is circular in cross-section;

a second waveguide member having a second waveguide having approximately the same cross-section as the first waveguide, an end face of the second waveguide member being opposed to an end face of the first waveguide member;

a rotary bearing that couples the first waveguide member and the second waveguide member in such a manner that they are rotatable about a central axis of the first and the second waveguides;

a first coil holder that is provided on the first waveguide member in a ring-like manner with the central axis of the first and second waveguides as a center and that holds a first coil; and a second coil holder that is provided on the second waveguide member in a ring-like manner with the central axis of the first and second waveguides as a center, and that holds a second coil that is opposed to the first coil, wherein the first and second coil holders are so shaped as to surround the first and second coils in a cross-section that is obtained by cutting the first and second coil holders by a plane including the central axis of the first and second waveguides.

10. The waveguide rotary coupler according to claim 9, wherein the first and second coil holders are formed separately from the first and second waveguide members, respectively, and then connected to the first and second waveguide members, respectively, after the first and second waveguide members are coupled to each other by the rotary bearing.

11. The waveguide rotary coupler according to claim 9, wherein the second coil is located outside the first coil and coextend with the first coil around the central axis of the first and second waveguides.

12. The waveguide rotary coupler according to claim 11, wherein the first coil holder holds two first coils and the second coil holder holds two second coils that are opposed to the respective first coils.

13. The waveguide rotary coupler according to claim 9, wherein the first and second waveguide members are made of a magnetic material.

14. The waveguide rotary coupler according to claim 9, wherein the rotary bearing is made of a ceramic material.

* * * * *